(No Model.) 3 Sheets—Sheet 1.
J. HENWOOD.
MACHINE FOR CHANNELING SLATE, &c.
No. 318,735. Patented May 26, 1885.
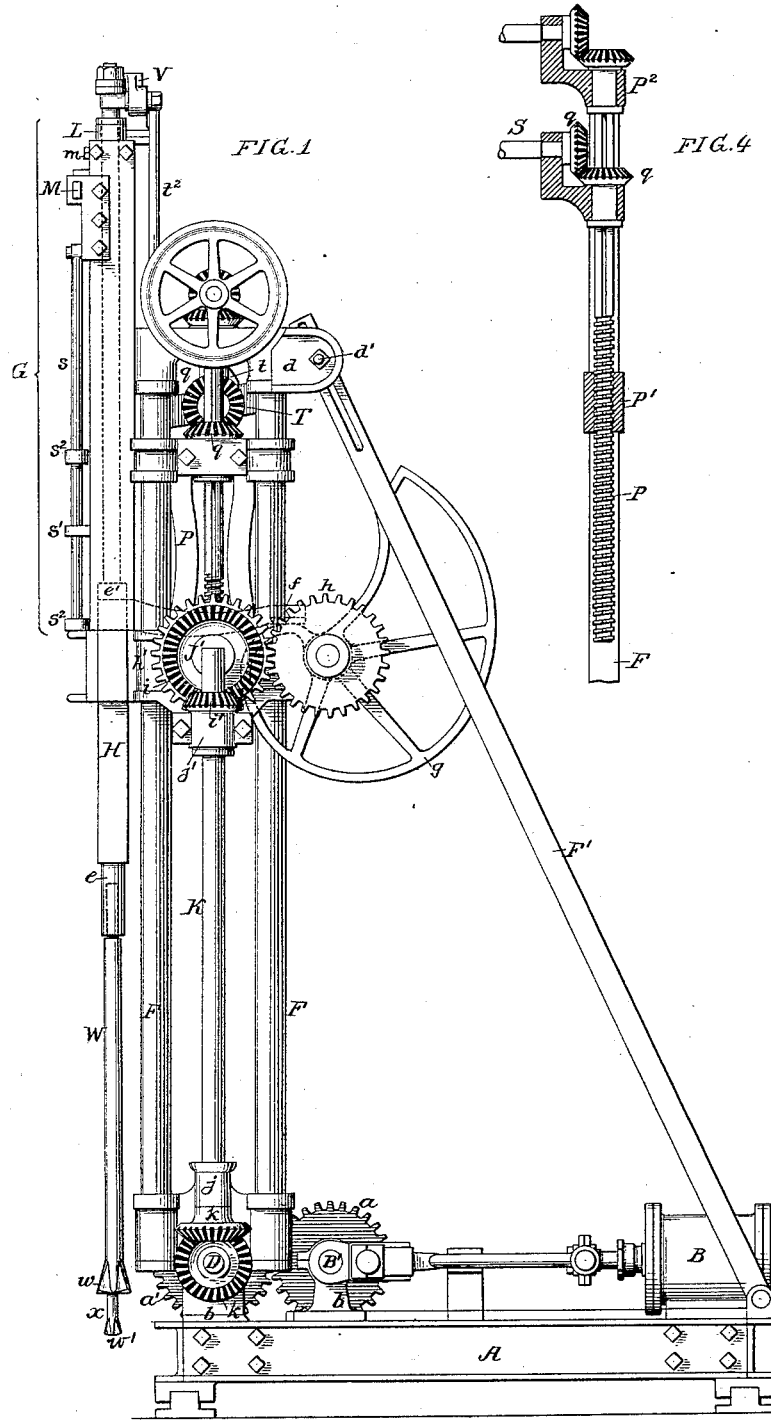
Witnesses
John M. Clayton
James F. Tobins
Inventor
John Henwood
by his attys
Howson and Son

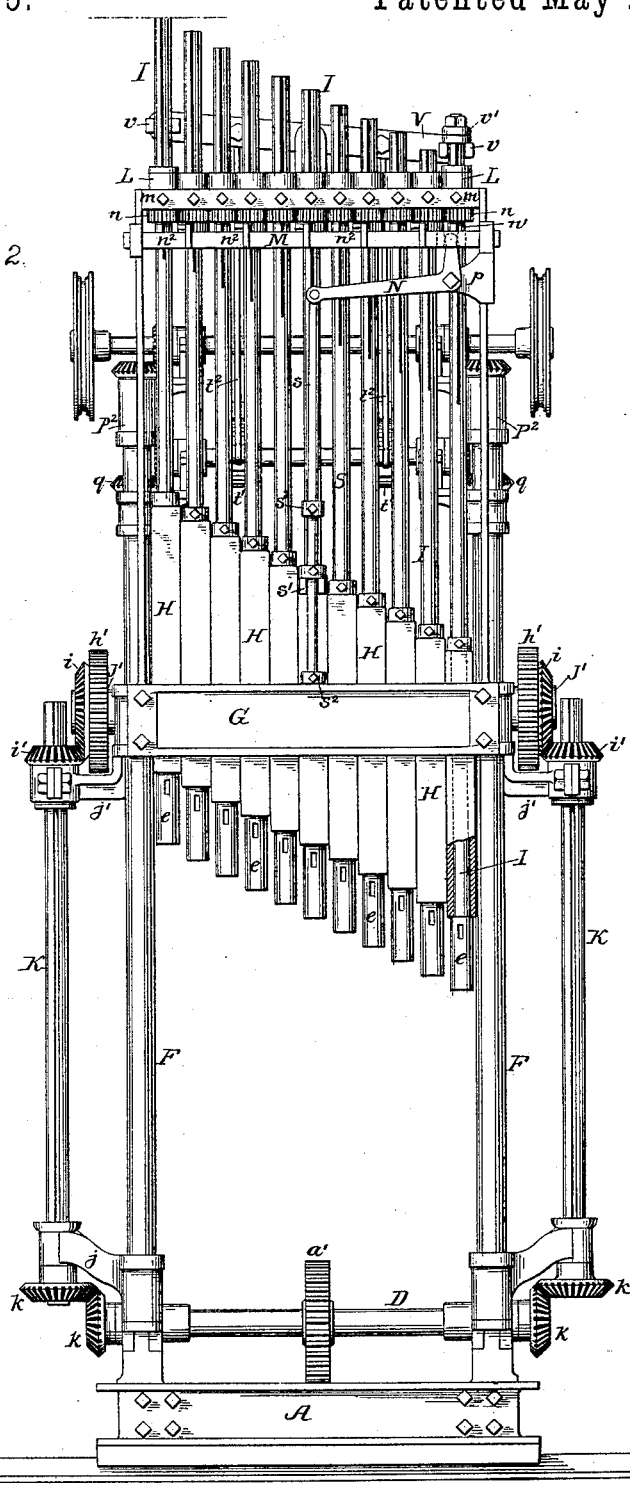

(No Model.)   3 Sheets—Sheet 3.
J. HENWOOD.
MACHINE FOR CHANNELING SLATE, &c.
No. 318,735.  Patented May 26, 1885.
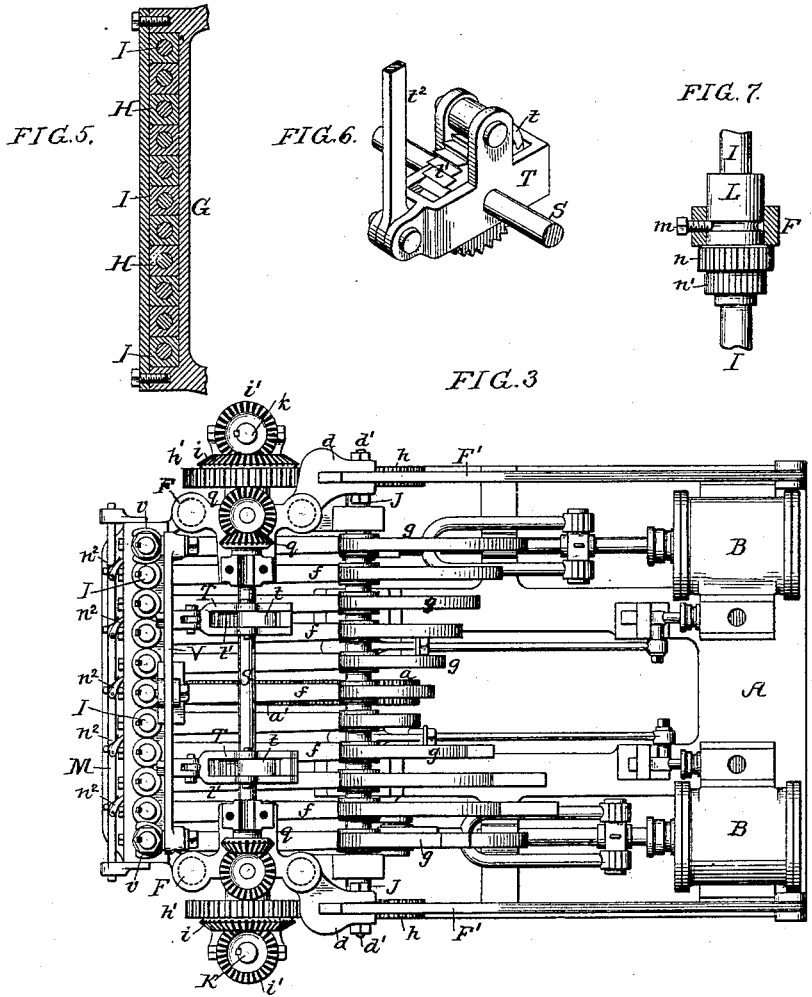
Witnesses
John M. Clayton.
James F. Tobin
Inventor
John Henwood
by his Atty
Howson and Son

UNITED STATES PATENT OFFICE.

JOHN HENWOOD, OF PHILADELPHIA, PENNSYLVANIA.

MACHINE FOR CHANNELING SLATE, &c.

SPECIFICATION forming part of Letters Patent No. 318,735, dated May 26, 1885.

Application filed May 12, 1884. (No model.)

*To all whom it may concern:*

Be it known that I, JOHN HENWOOD, a citizen of the United States, and a resident of Philadelphia, Pennsylvania, have invented certain Improvements in Machines for Channeling Slate, &c., of which the following is a specification.

The object of my invention is to construct a machine for cutting a channel in slate or similar laminated mineral, and this object I attain by combining feed and reciprocating mechanism with a series of drills placed closely side by side and so constructed as to cut overlapping openings, as hereinafter set forth.

In the accompanying drawings, Figure 1, Sheet 1, is a side view of the improved channeling-machine; Fig. 2, Sheet 2, a front view of the same; Fig. 3, Sheet 3, a plan view; Fig. 4, Sheet 1, a vertical section showing one of the feed-screws and its nut; Figs. 5, 6, and 7, Sheet 3, detached views of parts of the machine; Fig. 8, a view of one of the drills, and Fig. 9 a view of the channel cut by the drills.

A is the base of the machine, consisting of a substantial frame-work, and carrying the engines B, the latter driving a shaft, B', which is geared by spur-wheels $a$ $a'$ to a shaft, D, both of these shafts being adapted to suitable bearings, $b$, on the base.

To the shaft D is hung the lower end of a vertical frame, F, and to jaws $d$, at the upper end of the latter, are adapted the slotted upper ends of braces F', pivoted to the base A at the lower ends, and confined to the jaws $d$ by bolts $d'$ and suitable nuts, so that the frame F can be adjusted to any desired angle and secured in position after adjustment.

Guided on the posts of the frame F is a carriage, G, and in bearings in the latter are adapted to slide a series of sleeves, H, through which pass the spindles I of the cutters or drills, these spindles being confined to the sleeves by means of the enlarged heads $e$ at the lower ends of the spindles, and collars $e'$, secured to the spindle above the sleeves and bearing upon the upper ends of the latter, so that while the spindles are compelled to move vertically with the sleeves they can rotate freely in the latter. Each sleeve H has a projecting arm, $f$, which is acted upon by a tappet, $g$, on a shaft, J, adapted to bearings in the carriage G, and driven by spur-wheels $h$ $h'$ from sleeves J', which turn on studs on the carriage, and have bevel-wheels $i$, gearing into pinions $i'$ on opposite vertical shafts K, free to turn in lower bearings, $j$, on the frame A, and upper bearings, $j'$, on the carriage, these shafts being driven by bevel-gears $k$ from the shaft D, and being provided with key-seats for the reception of splines in the hubs of the pinions $i'$, so that the carriage G can be moved up and down on the frame F without interfering with the operation of the shaft J.

The upper portions of the spindles I are grooved for the reception of splines in short sleeves L, which are externally grooved for the reception of the ends of set-screws $m$ in the top bar of the carriage, as shown in Fig. 7, so that the sleeves are confined vertically to but can turn in said top bar, and the spindles I can pass freely through, but are compelled to turn with the sleeves. The said sleeves are geared together by spur-wheels $n$, and alternate sleeves are provided with ratchet-wheels $n'$, with the teeth of which engage pawls $n^2$, carried by a bar, M, adapted to slide transversely in guides on the carriage G.

A bell-crank lever, N, is hung to a stud, $p$, on the carriage, one arm of this lever fitting between lugs on the bar M, and the other arm being connected to a rod, $s$, the lower end of which is embraced by a fork, $s'$, on one of the sleeves H, and has two collars, $s^2$, which, as the sleeve H is elevated and allowed to fall, are struck alternately by said fork $s'$, thus causing a vibration of the lever N and a reciprocation of the bar M to an extent determined by the position of the collars in respect to the throw of the sleeve H, and the collars being adjusted in accordance with the desired extent of rotation of the drill-spindles on each reciprocation of the same—that is to say, the closer together the collars, the more the spindles I will be turned.

The carriage is fed forward on the frame A as the drills penetrate the rock, the feed-screws P being adapted to nuts P' on the carriage, Fig. 4, and being confined vertically to bearings P² at the top of the frame A, so that as the screws are rotated the carriage will be raised or lowered.

The screws are geared by bevel-wheels $q$ to a transverse shaft, S, on which are hung two frames, T, Fig. 6, each carrying a pawl, $t$ adapted to the teeth of a ratchet-wheel, $t'$, on the shaft S, each frame being connected by a rod, $t^2$, to a lever, V, hung to a bearing on the carriage, and having at the opposite ends forks $v$, adapted to embrace the outermost drill-spindles I, which have collars $v'$ at the upper ends, so that as the drill-spindles rise and fall a vibrating movement will be imparted to the lever V, and thence to the frames T, the pawls of which operate the ratchet-wheels of the shaft S. A single pawl-frame and ratchet only may be used, if desired.

The extent of movement of the lever V is dependent upon the extent of penetration of the drills, thus the greater the penetration the more rapid the feed.

Each drill W, Fig. 8, is keyed to the head of a drill-spindle, I, and the drills have at the lower ends expanded bits $w$, the drills being arranged so closely together that the bits overlap each other, so that the holes made by the drills merge into each other and form a channel, as shown in Fig. 9. The drills hence have no lateral guidance in the channel, and in order to prevent them from being deflected I provide each drill with a projecting stem, $x$, of contracted diameter, this stem having at the ends bits $w'$, forming a guide-hole, $x'$, in advance of the channel, and thus serving to keep the drills at all times properly in line and insure the formation of a series of perfectly parallel bores.

The drill spindles and sleeves may be allowed to fall by their own weight; or, if desired, springs may be interposed between the collars $e'$ and the lower ends of the sleeves L.

I am aware that mining-machines have been devised in which a series of rotating boring-tools have been placed side by side and provided with bits so constructed as to form overlapping bores; but such machines have not been available for cutting channels in slate and like fibrous or laminated minerals, owing to the tendency of the rotating bits to bind in the bores. I find, however, that when a series of drills constructed in this manner are subjected to a combined reciprocating and rotating movement they can be used effectively for cutting slate and such minerals. So far as this feature of my invention is concerned, I do not limit myself to the exact mechanism shown for reciprocating and rotating the drills, although the mechanism shown is preferred.

I do not desire to claim in this application the specific mechanism employed for rotating, reciprocating, and feeding the drill-spindles, as this will form the subject of a separate application which I am about to file; but

I claim as my invention—

The combination, in a machine for channeling slate and similar laminated minerals, of a series of drill-spindles guided side by side and having overlapping bits with mechanism for rotating and reciprocating said spindles.

In testimony whereof I have signed my name to this specification in the presence of two subscribing witnesses.

JOHN HENWOOD.

Witnesses:
JOHN M. CLAYTON,
HARRY SMITH.